United States Patent
Wang et al.

(10) Patent No.: US 12,164,594 B2
(45) Date of Patent: Dec. 10, 2024

(54) SYSTEMS AND METHODS FOR SCHEDULING ENVIRONMENT PERCEPTION-BASED DATA OFFLOADING FOR NUMEROUS CONNECTED VEHICLES

(71) Applicant: Toyota Motor Engineering & Manufacturing North America, Inc., Plano, TX (US)

(72) Inventors: Haoxin Wang, Charlotte, NC (US); Akila C. Ganlath, Agua Dulce, CA (US); Nejib Ammar, San Jose, CA (US); Onur Altintas, Mountain View, CA (US); Prashant Tiwari, Santa Clara, CA (US); Takayuki Shimizu, Santa Clara, CA (US); BaekGyu Kim, Mountain View, CA (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 742 days.

(21) Appl. No.: 17/338,884

(22) Filed: Jun. 4, 2021

(65) Prior Publication Data

US 2022/0391634 A1    Dec. 8, 2022

(51) Int. Cl.
*G06F 18/211*    (2023.01)
*G01C 21/00*    (2006.01)
(Continued)

(52) U.S. Cl.
CPC ........ *G06F 18/211* (2023.01); *G01C 21/3833* (2020.08); *G06F 18/2163* (2023.01);
(Continued)

(58) Field of Classification Search
None
See application file for complete search history.

(56) References Cited

U.S. PATENT DOCUMENTS

| | | | |
|---|---|---|---|
| 9,674,113 B2 | 6/2017 | Yousefi et al. |
| 9,967,172 B2 | 5/2018 | Kao et al. |
| 10,268,207 B2 | 4/2019 | Lei et al. |
| 10,706,642 B2 | 7/2020 | Throop et al. |
| 10,841,762 B2 | 11/2020 | Henry et al. |
| 2010/0283589 A1 | 11/2010 | Kawai et al. |

(Continued)

FOREIGN PATENT DOCUMENTS

| | | |
|---|---|---|
| CN | 108235063 A | 6/2018 |
| CN | 111343275 A | 6/2020 |

(Continued)

OTHER PUBLICATIONS

"Efficient mobility-aware task offloading for vehicular edge computing networks" IEEE Access, vol. 7, 2019. Feb. 21, 2019.

*Primary Examiner* — Mohammed Rachedine
(74) *Attorney, Agent, or Firm* — Dinsmore & Shohl LLP (57) ABSTRACT

Systems and methods for scheduling environment perception-based data offloading for numerous connected vehicles are disclosed. In one embodiment, a method for offloading data includes capturing an image of a view of interest from a vehicle, segmenting the image into a plurality of blocks, and determining a scheduling priority for each of one or more blocks among the plurality of blocks based on block values, wherein the block values relate to one or more objects of interest contained in each of the one or more blocks. The method further includes offloading, from the vehicle to a server, one or more blocks based on the scheduling priority of the one or more blocks.

20 Claims, 9 Drawing Sheets

(51) Int. Cl.
   *G06F 18/21*     (2023.01)
   *G06F 18/25*     (2023.01)
   *G06V 10/26*     (2022.01)
   *G06V 10/50*     (2022.01)
   *G06V 20/56*     (2022.01)
   *H04L 67/12*     (2022.01)
   *H04L 67/5651*   (2022.01)
   *H04W 4/18*      (2009.01)
   *H04W 4/44*      (2018.01)
   *B60W 60/00*     (2020.01)

(52) U.S. Cl.
   CPC .............. *G06F 18/25* (2023.01); *G06V 10/50* (2022.01); *G06V 20/56* (2022.01); *H04L 67/12* (2013.01); *B60W 60/001* (2020.02); *B60W 2420/403* (2013.01); *B60W 2554/20* (2020.02); *B60W 2554/4029* (2020.02); *B60W 2556/65* (2020.02)

(56) References Cited

U.S. PATENT DOCUMENTS

| | | | |
|---|---|---|---|
| 2019/0339709 A1* | 11/2019 | Tay | G06F 16/23 |
| 2020/0245210 A1* | 7/2020 | Fotheringham | H04L 49/25 |
| 2020/0279377 A1* | 9/2020 | Gabel | G06T 7/254 |
| 2021/0056843 A1 | 2/2021 | Kaur et al. | |
| 2021/0075735 A1 | 3/2021 | Tsuji et al. | |
| 2021/0150280 A1* | 5/2021 | White | G01C 21/3605 |
| 2022/0032932 A1* | 2/2022 | Kale | G06N 3/045 |
| 2022/0169282 A1* | 6/2022 | Gan | B60W 60/0015 |

FOREIGN PATENT DOCUMENTS

| | | | | |
|---|---|---|---|---|
| CN | 112615797 A | * | 4/2021 | G07C 5/008 |
| CN | 111262940 B | * | 6/2021 | G06F 16/23 |
| CN | 114157660 A | * | 3/2022 | |
| WO | 2019168355 A1 | | 9/2019 | |
| WO | WO-2021113256 A1 | * | 6/2021 | G06F 16/14 |

* cited by examiner

SYSTEMS AND METHODS FOR SCHEDULING ENVIRONMENT PERCEPTION-BASED DATA OFFLOADING FOR NUMEROUS CONNECTED VEHICLES

TECHNICAL FIELD

The present disclosure relates to data offloading systems and more particularly to systems and methods for scheduling data offloading for numerous connected vehicles.

BACKGROUND

Connected vehicles may be connected to the Internet to send and/or receive data to improve the functionality of the connected vehicle. Connected vehicles may also be equipped with cameras and other sensors for perceiving their environment. Collecting large volumes of data (e.g., photos, videos, point clouds, 3D data models, and other digital representations) from its equipped sensors may lead to a more comprehensive perception of the connected vehicle's physical environment. However, the large volume of data collected may place a heavy load on networks and servers that the vehicle is connected to, thereby leading to increased end-to-end latency. On the other hand, collecting smaller volumes of data may reduce end-to-end latency by reducing the load on networks and servers. However, a smaller volume of data may provide less sufficient environmental perception for the connected vehicle. These problems are compounded when scaling up to numerous connected vehicles.

Therefore, a need exists for systems and methods for offloading environment perception-based data that can reduce end-to-end latency while maintaining the comprehensiveness of a connected vehicle's environmental perception, even when scaled across numerous connected vehicles.

SUMMARY

In accordance with one embodiment of the present disclosure, a method for offloading data includes capturing an image of a view of interest from a vehicle, segmenting the image into a plurality of blocks, and determining a scheduling priority for each of one or more blocks among the plurality of blocks based on block values, wherein the block values relate to one or more objects of interest contained in each of the one or more blocks. The method further comprises offloading, from the vehicle to a server, one or more blocks based on the scheduling priority of the one or more blocks.

In accordance with another embodiment of the present disclosure, a system for offloading data comprising a processor operable to capture an image of a view of interest from a vehicle, segment the image into a plurality of blocks, and determine a scheduling priority for each of one or more blocks among the plurality of blocks based on block values, wherein the block values relate to one or more objects of interest contained in each of the one or more blocks. The processor is further operable to offload, from the vehicle to a server, one or more blocks based on the scheduling priority of the one or more blocks.

In accordance with yet another embodiment of the present disclosure, a server includes a controller programmed to group a plurality of vehicles, and obtain images from the plurality of vehicles, each of the images corresponding to one of the plurality of vehicles and having a plurality of blocks. The controller is further programmed to obtain an image value of each of the images based on one or more objects of interest contained in each of the images, determine scheduling priorities for the plurality of vehicles based on the image values, and instruct the plurality of vehicles to offload data based on the scheduling priorities.

These and additional features provided by the embodiments of the present disclosure will be more fully understood in view of the following detailed description, in conjunction with the drawings.

BRIEF DESCRIPTION OF THE DRAWINGS

The following detailed description of specific embodiments of the present disclosure can be best understood when read in conjunction with the following drawings, where like structure is indicated with like reference numerals and in which.

DETAILED DESCRIPTION

Autonomous vehicles rely on their perception of the environment to make decisions about how they should navigate the environment. To have such perceptions, autonomous vehicles may include a variety of sensors, such as cameras, to capture digital representations of the environment. A vehicle's perception of its environment may be improved by relating it to the environmental perception of another vehicle, thereby creating a more comprehensive perception of the vehicle's environment. Accordingly, autonomous vehicles may also be connected vehicles, meaning that they are connected to a computer network to facilitate the sharing of environment perception data between connected vehicles.

In addition to capturing a digital representation of the vehicle's environment, the digital representations of the environment may be processed to identify objects of interest, such as obstacles, signs, pedestrians, vehicles, and other objects that the vehicle may have to navigate around. Performing the processing on digital representations typically requires intensive computation. Depending on the volume of data that must be processed, it may be more efficient to outsource the processing to a more powerful computing system, such as a server in a cloud computing system. Accordingly, connected vehicles may offload some or all of their data to the server for faster processing.

Although offloading environment perception-based data can improve the environmental perception of other connected vehicles and allow for faster processing of the data, offloading environment perception data is constrained by infrastructure and time requirements. For instance, collecting large volumes of data (e.g., camera images, point clouds, 3D models, and other digital representations of the environment) from a connected vehicle's sensors may lead to a more comprehensive perception of the connected vehicle's physical environment. However, the large volume of data may place a heavy load on networks and servers that the connected vehicle is connected to, thereby leading to increased end-to-end latency and processing times. On the other hand, collecting smaller volumes of data may reduce end-to-end latency by reducing the load on networks and servers. However, a smaller volume of data may provide an insufficient environmental perception for the connected vehicle. These problems are compounded when scaling up to numerous connected vehicles.

Figure 1:
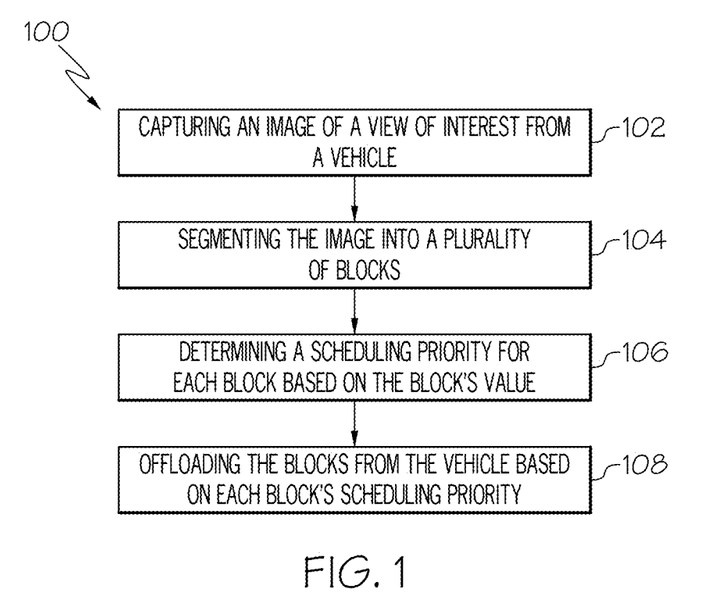
FIG. 1 depicts a flowchart of a method for offloading environment perception-based data, according to one or more embodiments shown and described herein.
Figure 2:
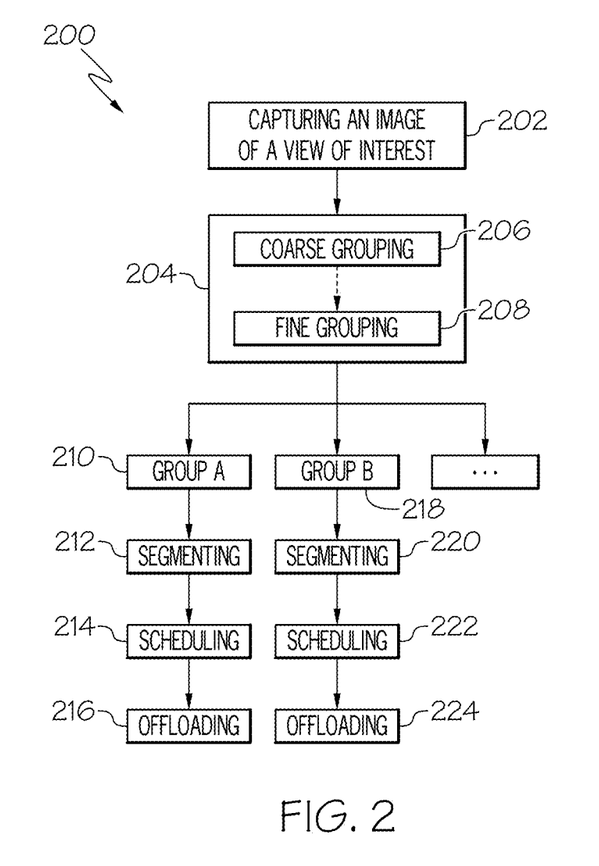
FIG. 2 depicts a flowchart of a method for offloading environment perception-based data from multiple connected vehicles, according to one or more embodiments shown and described herein.
Figure 4:
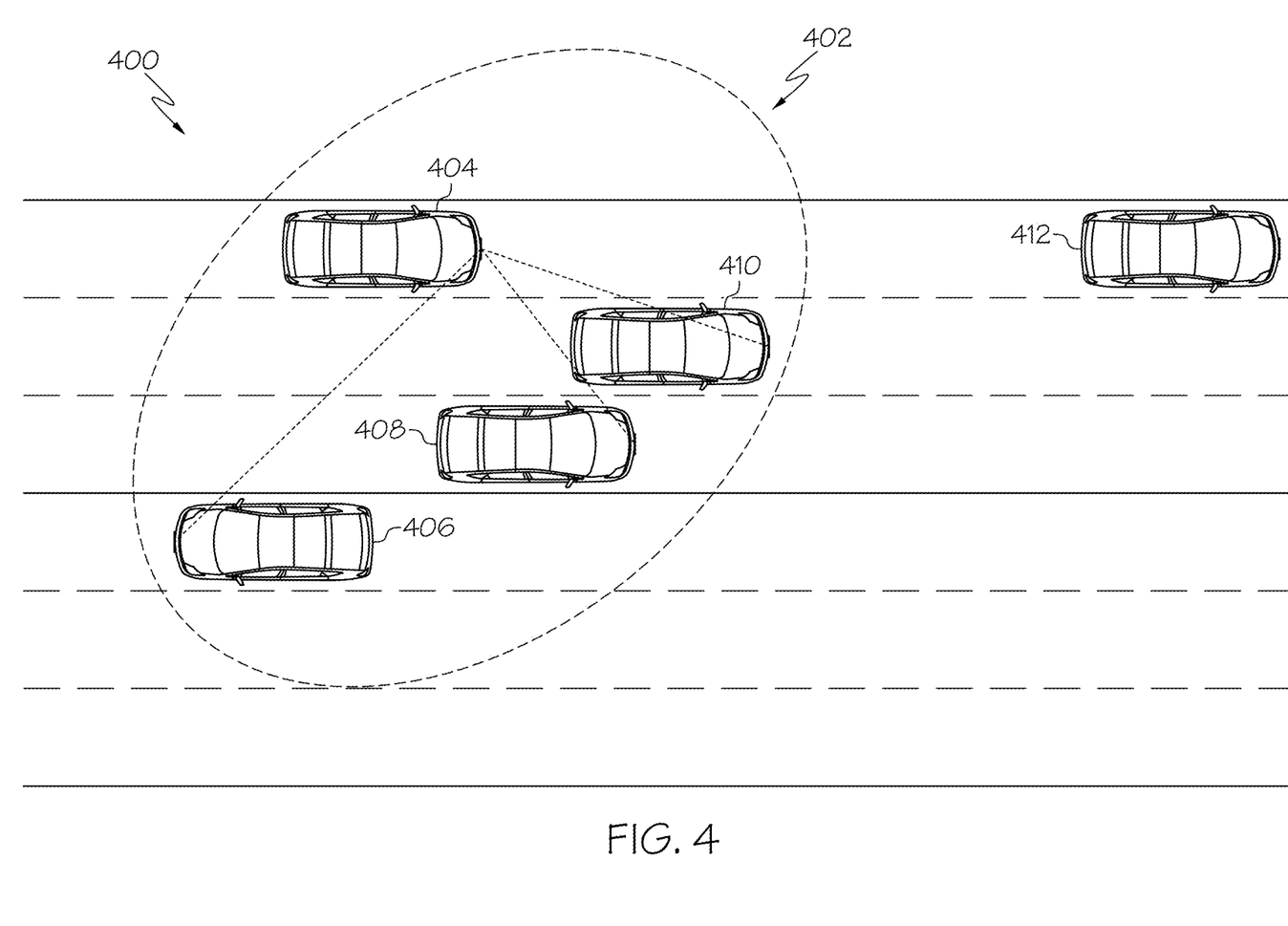
FIG. 4 depicts a coarse grouping of connected vehicles as performed in a step of the method of FIG. 2, according to one or more embodiments shown and described herein.
Figure 5:
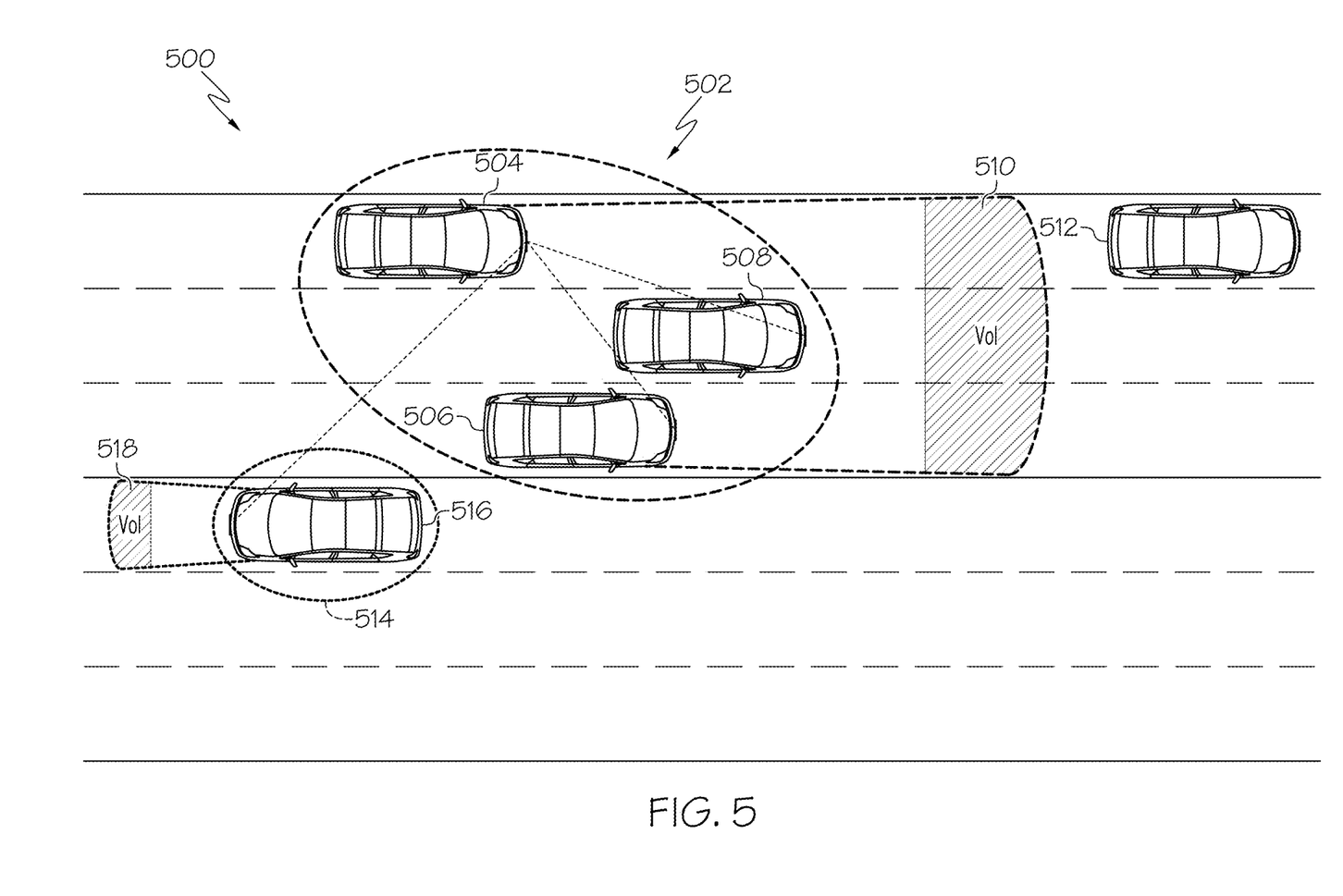
FIG. 5 depicts fine groupings of connected vehicles as performed in a step of the method of FIG. 2, according to one or more embodiments shown and described herein.
Figure 6:
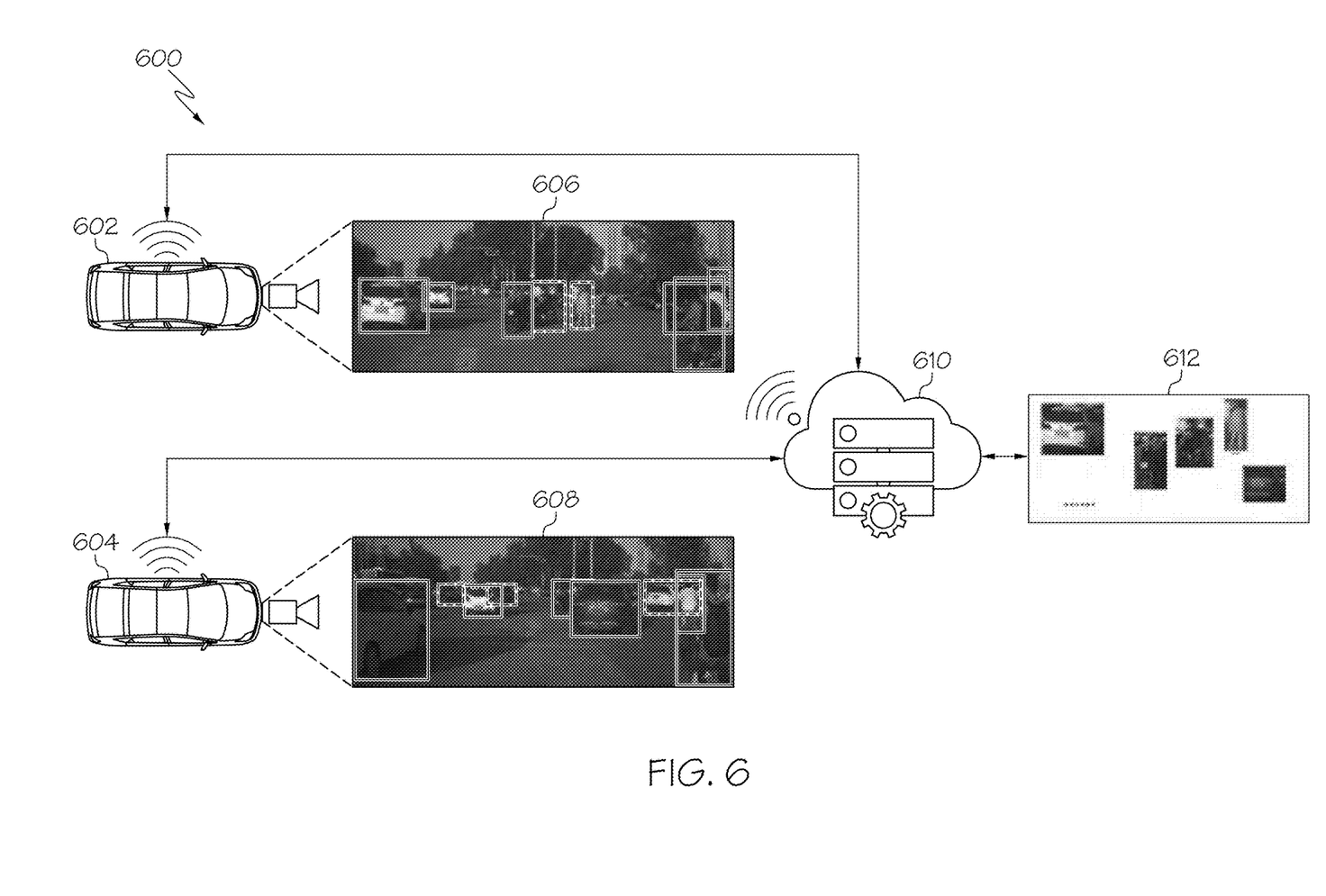
FIG. 6 depicts a schematic diagram of generating a global map, according to one or more embodiments shown and described herein.
Figure 7:
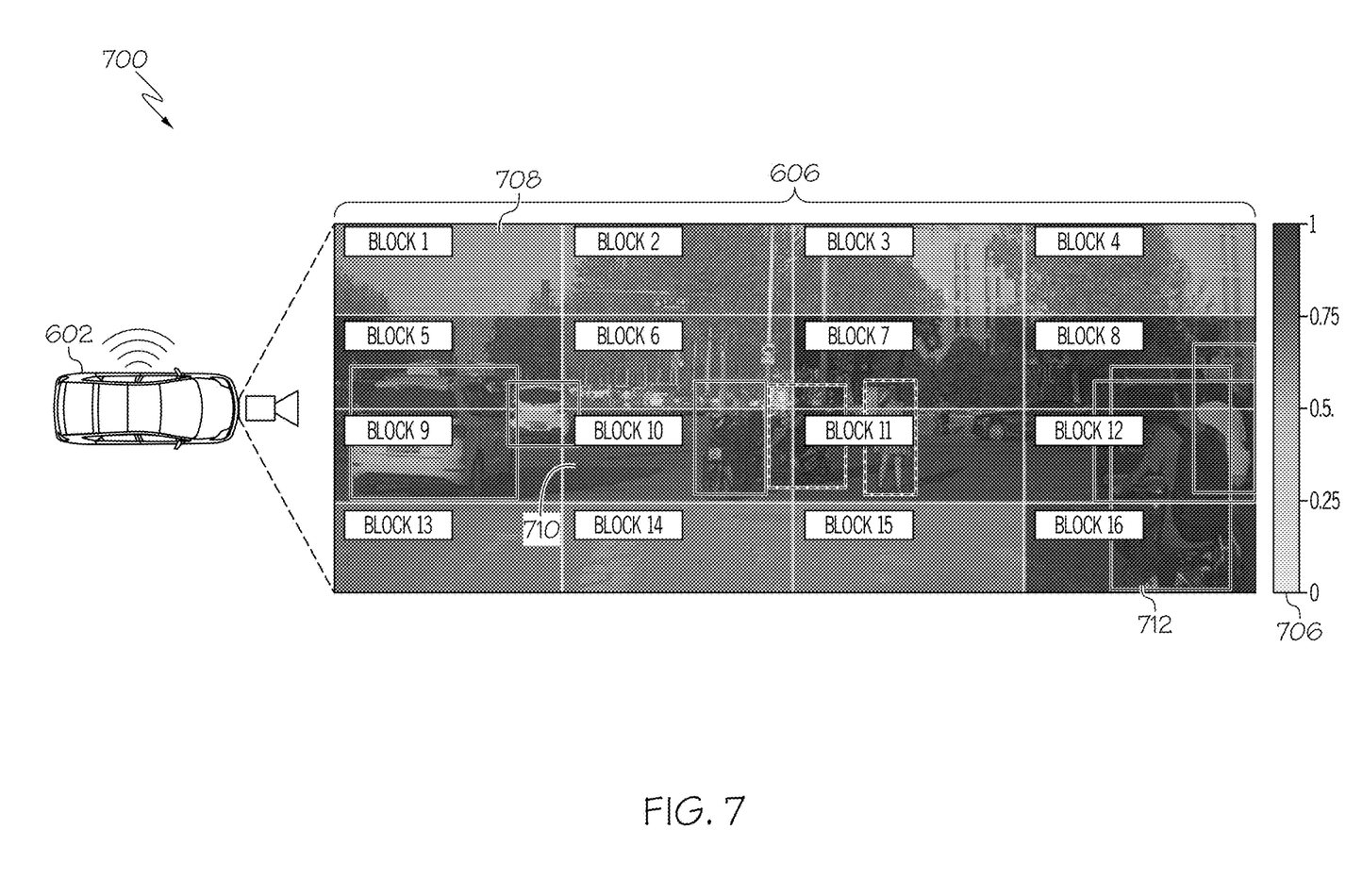
FIG. 7 depicts a segmenting process as performed in a step of the methods of FIG. 1 or FIG. 2, according to one or more embodiments shown and described herein.
Figure 8A:
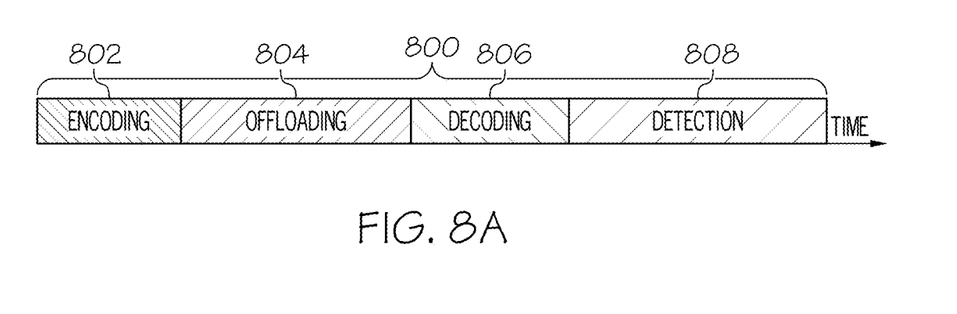
FIG. 8A depicts a latency period for data offloading using an offloading process that does not segment images into blocks.
Figure 8B:
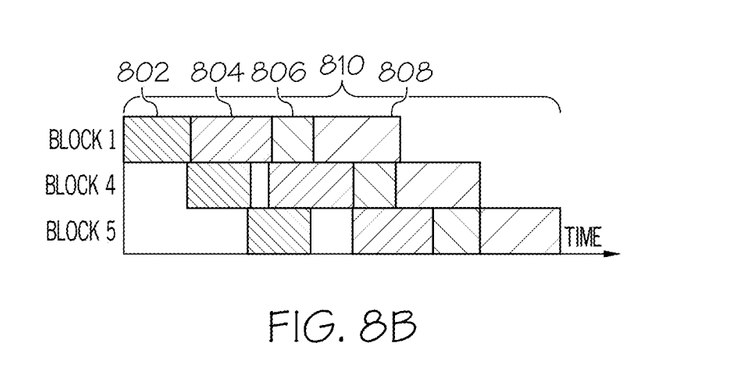
FIG. 8B depicts a latency period for data offloading using offloading processes according to one or more embodiments shown and described herein.
Figure 9A:
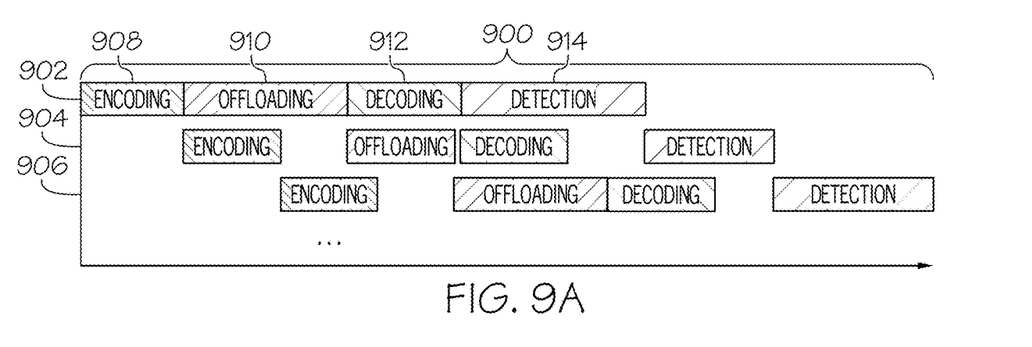
FIG. 9A depicts a latency period for data offloading from multiple connected vehicles using an offloading process that does not segment images into blocks.
Figure 9B:
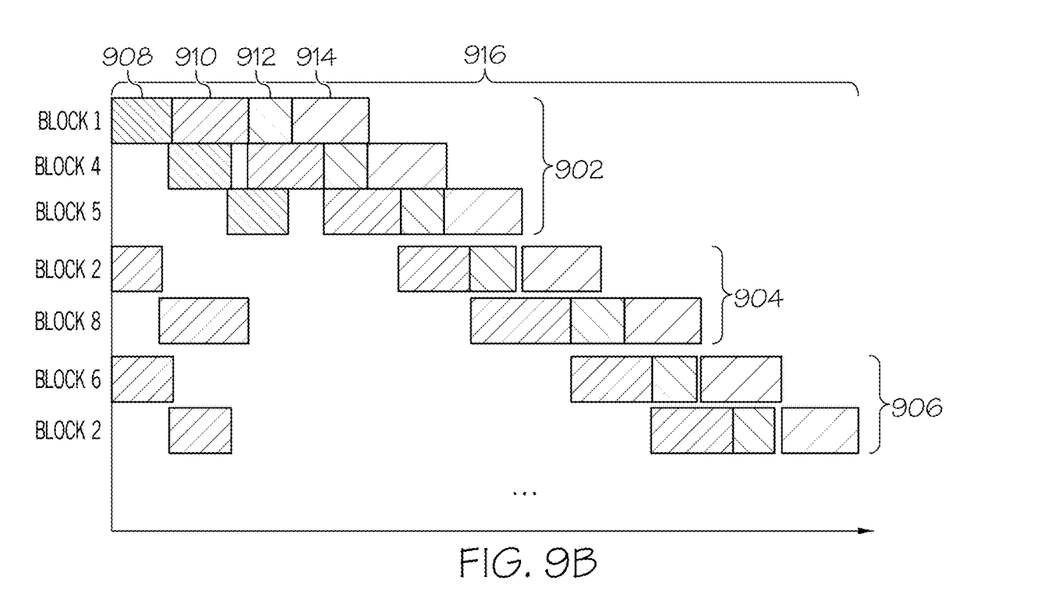
FIG. 9B depicts a latency period for data offloading from multiple connected vehicles using offloading processes according to one or more embodiments shown and described herein.

To address the foregoing issues, embodiments of the present disclosure disclose systems and methods for offloading environment perception-based from connected vehicles. Embodiments are primarily directed towards systems and methods for multiple connected vehicles, as illustrated in FIG. 2, but may be utilized in single connected vehicle scenarios, as illustrated in FIG. 1. Embodiments may divide connected vehicles into groups that may capture similar objects of interest and/or views of interest, as illustrated in FIGS. 4-6, so that each vehicle in a group does not need to offload data regarding the same objects and/or views. Embodiments may then segment each frame of environmental perception data into blocks and assign them a value, as illustrated in FIG. 7. Furthermore, embodiments may schedule data collection and offloading for connected vehicles such that both the total value of offloaded blocks and environmental perception coverage are maximized, as illustrated in FIGS. 8 and 9. In this regard, embodiments make the offloaded data more valuable and prevent the offloading of redundant information (e.g., ground, sky, and the like) for efficient and comprehensive processing of environment perception data.

Referring now to FIG. 1, a flowchart of a process 100 for offloading environment perception-based data is depicted. At step 102, a connected vehicle may capture an image of a view of interest. The connected vehicle may be equipped with one or more sensors to capture an image. An image may be a still image, multiple images that together may be frames of a video, or other digital representations of a vehicle's environment. A view of interest may be a view from the connected vehicle's perspective in the direction that the connected vehicle is moving. The connected vehicle may be a vehicle including an automobile or any other passenger or non-passenger vehicle such as, for example, a terrestrial, aquatic, and/or airborne vehicle. In some embodiments, the connected vehicle may be an unmanned aerial vehicle (UAV), commonly known as a drone.

At step 104, the image captured at step 102 may be segmented into a plurality of blocks. The blocks may be logical divisions within the image for individual analysis. The number of blocks may be preprogrammed or determined by a server so that each image may be segmented the same way.

At step 106, a scheduling priority for each block may be determined based on the block's value. Each block of an image may be analyzed to assign it a value. The value may be based on a block value function having parameters including a number of objects of interest (OoI) in a corresponding block, object type, object speed, and other object characteristics.

At step 108, blocks may be offloaded from the connected vehicle based on scheduling priority. Blocks having a higher value may be scheduled with a higher priority than blocks having a lower value. For example, a block containing a pedestrian may have a higher value than a block that contains the sky. The pedestrian is an object of interest that may move and the connected vehicle must adjust its behavior in time to compensate for the pedestrian's movement. On the other hand, the sky has little impact on the connected vehicle's driving and remains fairly unchanged throughout the drive. Accordingly, the block containing the sky should be offloaded after the block containing the pedestrian so that the connected vehicle may receive a faster response from the server about the pedestrian. Subsequent blocks containing the sky may not need to be uploaded for each image if they amount to redundant information. In some embodiments, the blocks containing the sky may not be offloaded at all.

Referring now to FIG. 2, a flowchart of a process 200 for data offloading from multiple connected vehicles is depicted. At step 202, connected vehicles may capture an image of a view of interest. Each of the connected vehicles may be equipped with one or more sensors to capture an image. An image may be a still image, multiple images that together may be frames of a video, or other digital representations of a vehicle's environment.

At step 204, the connected vehicles may be grouped based on similar views of interest to facilitate offloading of data. Identifying similar views of interest allows for the reduction of redundant information because vehicles with the same view are likely to capture overlapping information. Vehicles may first be grouped by coarse grouping 206, wherein connected vehicles are grouped based on localization, as shown in FIG. 4. Grouping based on localization (i.e., coarse grouping 206) provides a fast approach to find a group of connected vehicles that may have a similar view of interest. Additionally or alternatively, connected vehicles may be grouped by fine grouping 208, wherein connected vehicles are grouped based on perceived objects of interest, as shown in FIG. 5. Vehicles that have common objects of interest in their views of interest may be grouped together. A server may be used to determine what vehicles are perceiving common objects of interest because the server may receive images from multiple connected vehicles and compare objects of interest between them. Coarse grouping 206 and/or fine grouping 208 may create one or more groups, such as group A 210 and group B 218, that may each independently proceed with the offloading process 200.

At steps 212, 220, each of the images captured by the connected vehicles at step 202 may be segmented into a plurality of blocks. The blocks may be logical divisions within the image for individual analysis. The number of blocks may be preprogrammed or determined by a server so that each image may be segmented the same way.

At steps 214, 222, a scheduling priority for each block may be determined based on the block's value. Each block of an image may be analyzed to assign it a value. The value may be based on a number of objects of interest, object type, object speed, and other object characteristics in each block. The value may be further based on coverage, such that a block may receive a higher value if it adds to the comprehensiveness of the server's global map. Values may be negatively impacted by potential costs, including redundant information, processing time, and other factors that may increase upload time. The scheduling priority may be relative to the scheduling priority of blocks from images taken at the same point in time by other connected vehicles in the same grouping. Blocks may be scheduled such that the value of the blocks uploaded in the grouping is maximized.

At steps 216, 224, blocks may be offloaded from the connected vehicles based on scheduling priority. Blocks having a higher value may be scheduled with a higher priority than blocks with a lower value. Offloading may include multiple phases, including an encoding phase and an offloading phase. The encoding phase may include preparing the block for uploading, for example, by compressing the block. The encoding phase may rely on vehicle resources. The offloading phase may include uploading the block to the server, for example, by finding an available server and establishing an offloading session with the server. The offloading phase may rely on network resources. Encoding may be performed simultaneously between connected vehicles because encoding relies on vehicle resources, whereas uploading may be performed sequentially because uploading relies on network resources shared among the group, for example, as illustrated in FIG. 9B.

For example, assume connected vehicle A has blocks 1 and 3 and connected vehicle B has blocks 2 and 4, and the blocks are numbered according to their scheduling priority (with 1 being the highest priority). Connected vehicles A and B may encode blocks 1 and 2 simultaneously and then blocks 3 and 4. Block 1 may be uploaded after it is encoded by connected vehicle A and may be uploaded while blocks 3 and 4 are being encoded. Block 2 may be queued for uploading by connected vehicle B after block 1. Blocks 3 and 4 may be queued for uploading after they have finished encoding. Assuming further that blocks 3 and 4 are redundant because they contain the information from overlapping fields of view, block 4 may receive an indication not to upload (e.g., a negative value) to maximize the value of the blocks received by the server.

Figure 3:
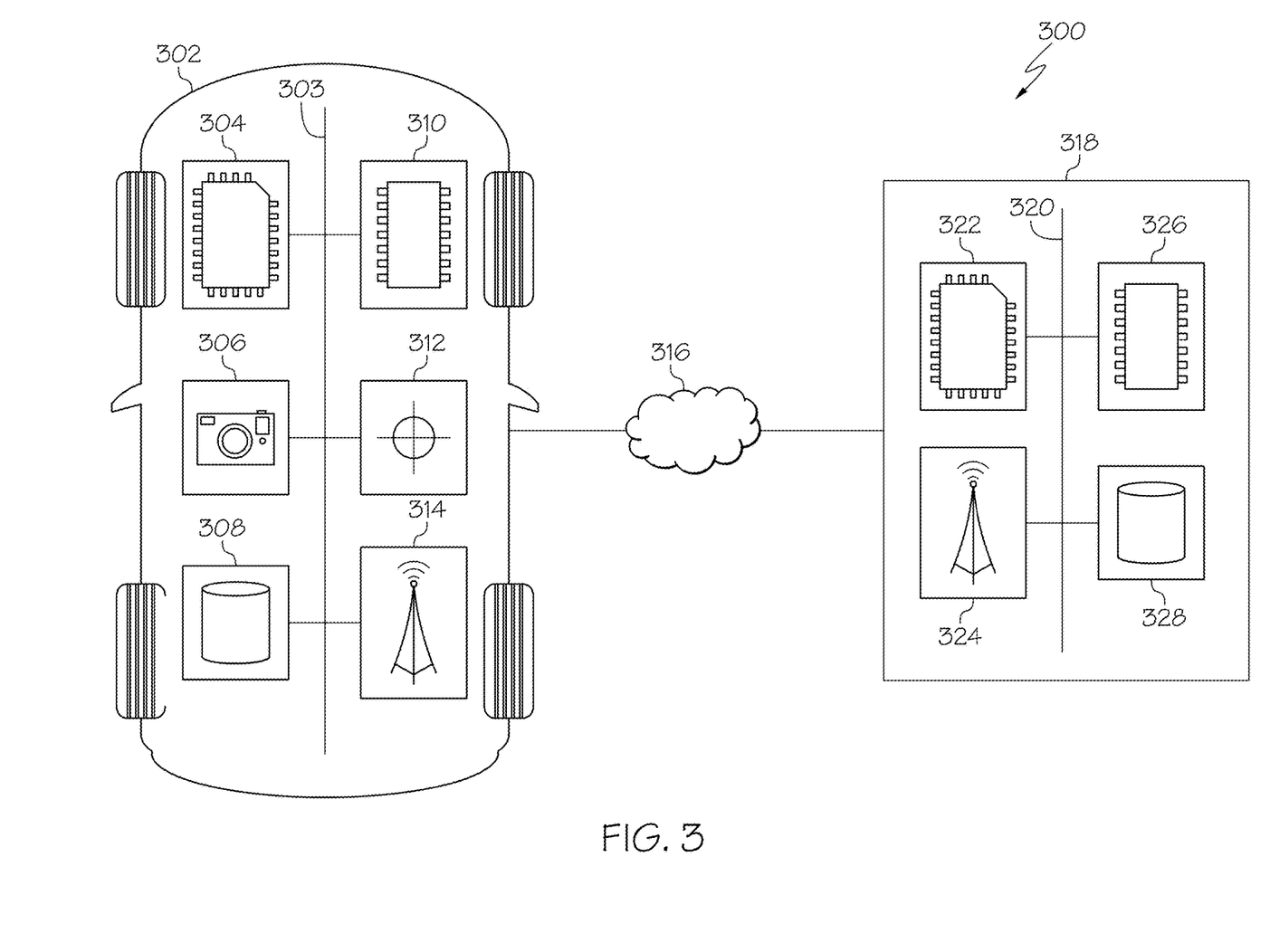
FIG. 3 depicts a schematic diagram of a system comprising a connected vehicle and a server, according to one or more embodiments shown and described herein.

Referring now to FIG. 3, a system 300 comprising a connected vehicle 302 and a server 318 are depicted. The connected vehicle 302 may include a processor component 304, a memory component 310, a data storage component 308, a sensor component 306, a network connectivity component 314, and a satellite component 312. The connected vehicle 302 may also include a communication path 303 that communicatively couples the various components of the connected vehicle 302.

The processor component 304 may include one or more processors that may be any device capable of executing machine-readable and executable instructions. Accordingly, each of the one or more processors of the processor component 304 may be a controller, an integrated circuit, a microchip, or any other computing device. The processor component 304 is coupled to the communication path 303 that provides signal connectivity between the various components of the connected vehicle. Accordingly, the communication path 303 may communicatively couple any number of processors of the processor component 304 with one another and allow them to operate in a distributed computing environment. Specifically, each processor may operate as a node that may send and/or receive data. As used herein, the phrase "communicatively coupled" means that coupled components are capable of exchanging data signals with one another such as, e.g., electrical signals via a conductive medium, electromagnetic signals via air, optical signals via optical waveguides, and the like.

Accordingly, the communication path 303 may be formed from any medium that is capable of transmitting a signal such as, e.g., conductive wires, conductive traces, optical waveguides, and the like. In some embodiments, the communication path 303 may facilitate the transmission of wireless signals, such as Wi-Fi, Bluetooth®, Near-Field Communication (NFC), and the like. Moreover, the communication path 303 may be formed from a combination of mediums capable of transmitting signals. In one embodiment, the communication path 303 comprises a combination of conductive traces, conductive wires, connectors, and buses that cooperate to permit the transmission of electrical data signals to components such as processors, memories, sensors, input devices, output devices, and communication devices. Accordingly, the communication path 303 may comprise a vehicle bus, such as, e.g., a LIN bus, a CAN bus, a VAN bus, and the like. Additionally, it is noted that the term "signal" means a waveform (e.g., electrical, optical, magnetic, mechanical, or electromagnetic), such as DC, AC, sinusoidal-wave, triangular-wave, square-wave, vibration, and the like, capable of traveling through a medium.

The memory component 310 is coupled to the communication path 303 and may contain one or more memory modules comprising RAM, ROM, flash memories, hard drives, or any device capable of storing machine-readable and executable instructions such that the machine-readable and executable instructions can be accessed by the processor component 304. The machine-readable and executable instructions may comprise logic or algorithms written in any programming language of any generation (e.g., 1 GL, 2 GL, 3 GL, 4 GL, or 5 GL) such as, e.g., machine language, that may be directly executed by the processor, or assembly language, object-oriented languages, scripting languages, microcode, and the like, that may be compiled or assembled into machine-readable and executable instructions and stored on the memory component 310. Alternatively, the machine-readable and executable instructions may be written in a hardware description language (HDL), such as logic implemented via either a field-programmable gate array (FPGA) configuration or an application-specific integrated circuit (ASIC), or their equivalents. Accordingly, the methods described herein may be implemented in any computer programming language, as pre-programmed hardware elements, or as a combination of hardware and software components. The memory component 310 includes machine-readable and executable instructions that, when executed by the processor component 304, cause the processor component 304 to capture an image of a view of interest from a vehicle, segment the image into a plurality of blocks, determine a scheduling priority for each of one or more blocks among the plurality of blocks based on block values, and offload one or more blocks based on the scheduling priority of the one or more blocks.

The sensor component 306 is coupled to the communication path 303 and communicatively coupled to the processor component 304. The sensor component 306 may include LIDAR sensors, RADAR sensors, optical sensors (e.g., cameras), laser sensors, proximity sensors, location sensors, and the like. In embodiments, the sensor component 306 may capture digital representations of the environment of the connected vehicle 302. The digital representations may be photos and/or videos (e.g., as captured by a camera) of the environment of the connected vehicle 302 or other digital representations of the environment of the connected vehicle 302 (e.g., as captured by LIDAR).

The network connectivity component 314 includes network connectivity hardware for communicatively coupling the connected vehicle 302 to the server 318. The network connectivity component 314 can be communicatively coupled to the communication path 303 and can be any device capable of transmitting and/or receiving data via a network or other communication mechanisms. Accordingly, the network connectivity component 314 can include a communication transceiver for sending and/or receiving any wired or wireless communication. For example, the network connectivity hardware of the network connectivity component 314 may include an antenna, a modem, an Ethernet port, a Wi-Fi card, a WiMAX card, a cellular modem, near-field communication hardware, satellite communication hardware, and/or any other wired or wireless hardware for communicating with other networks and/or devices.

The vehicle connectivity component (not shown) includes network connectivity hardware for communicatively coupling the connected vehicle 302 to other connected vehicles. The vehicle connectivity component can be communicatively coupled to the communication path 303 and can be any device capable of transmitting and/or receiving data via a network or other communication mechanisms. Accordingly, the vehicle connectivity component can include a communication transceiver for sending and/or receiving any wired or wireless communication. For example, the network connectivity hardware of the vehicle connectivity component may include an antenna, a modem, an Ethernet port, a Wi-Fi card, a WiMAX card, a cellular modem, near-field communication hardware, satellite communication hardware, and/or any other wired or wireless hardware for communicating with other networks and/or devices. The vehicle connectivity component may be used for grouping connected vehicles together and/or coordinating the scheduling of blocks.

The connected vehicle 302 may connect with one or more other connected vehicles and/or external processing devices (e.g., the server 318) via a direct connection. The direct connection may be a vehicle-to-vehicle connection ("V2V connection") or a vehicle-to-everything connection ("V2X connection"). The V2V or V2X connection may be established using any suitable wireless communication protocols discussed above. A connection between vehicles may utilize sessions that are time- and/or location-based. In embodiments, a connection between vehicles or between a vehicle and an infrastructure may utilize one or more networks to connect which may be in place of, or in addition to, a direct connection (such as V2V or V2X) between the vehicles or between a vehicle and an infrastructure. By way of a non-limiting example, vehicles may function as infrastructure nodes to form a mesh network and connect dynamically/ad-hoc. In this way, vehicles may enter/leave the network at will such that the mesh network may self-organize and self-modify over time. Other non-limiting examples include vehicles forming peer-to-peer networks with other vehicles or utilizing centralized networks that rely upon certain vehicles and/or infrastructure. Still, other examples include networks using centralized servers and other central computing devices to store and/or relay information between vehicles, such as location information to form groupings.

A satellite component 312 is coupled to the communication path 303 such that the communication path 303 communicatively couples the satellite component 312 to other modules of the connected vehicle 302. The satellite component 312 may comprise one or more antennas configured to receive signals from global positioning system (GPS) satellites. Specifically, in one embodiment, the satellite component 312 includes one or more conductive elements that interact with electromagnetic signals transmitted by GPS satellites. The received signal is transformed into a data signal indicative of the location (e.g., latitude and longitude) of the satellite component 312, and consequently, the connected vehicle 302.

The data storage component 308 may be included in the memory component 310. The data storage component 308 may store data used by various components and applications of the connected vehicle 302. In addition, the data storage component 308 may store data gathered by the sensor component 306, received from the server 318, and/or received from other vehicles. For example, the data storage component 308 may store blocks that have not yet been offloaded.

The connected vehicle 302 may be communicatively coupled to the server 318 by a network 316. The network 316 may be a wide area network, a local area network, a personal area network, a cellular network, a satellite network, and the like.

The server 318 comprises a processor component 322, a memory component 326, a network connectivity component 324, a data storage component 328, and a communication path 320. Each server component is similar in features to its connected vehicle counterpart, described in detail above. The memory component 326 includes machine-readable and executable, when executed by the processor component 322, that cause the server 318 to group a plurality of vehicles, obtain images from the plurality of vehicles each image corresponding to one of the plurality of vehicles, determine an image value of each of the images based on one or more objects of interest contained in each of the images, determine scheduling priorities for the plurality of vehicles based on the image values, and instruct the plurality of vehicles to offload data based on the scheduling priorities. The memory component 326 may also include machine-readable and executable instructions that further cause the processor component 322 to decode images and/or blocks of images as well as detect objects of interest within images and/or blocks of images.

Referring now to FIG. 4, a scenario 400 of a coarse grouping 402 of vehicles as performed in step 206 of the process 200 of FIG. 2 is depicted. To quickly group vehicles having a common view of interest, vehicles may be grouped based on localization. This coarse grouping 402 provides a fast way of grouping connected vehicles that may have a common view of interest, although it does not guarantee that each connected vehicle in the group has a common view of interest. Localization may be determined by GPS, GLONASS, Galileo, and other location determination systems from a connected vehicle's satellite component 312. The determinations may be performed on an ad hoc network between connected vehicles or by a server.

To perform a coarse grouping, the system may select a target vehicle 404 and a threshold distance a. Distance may be determined based on vehicle sensors and/or location data. Location data may be shared between vehicles or a server by V2V or V2X communication, respectively, to calculate distance. In some embodiments, connected vehicles around the target vehicle 404 are included in a coarse grouping 402 with the target vehicle 404 if their average distance to the target vehicle 404 is less than the threshold distance. For example, connected vehicles 406, 408, 410 are in a coarse grouping 402 with target vehicle 404 because their average distance D is $$D_1 = \frac{d_{1,2} + d_{1,3} + d_{1,4}}{3} < \alpha$$

where the distance between the target vehicle 404 and vehicle 406 is $d_{1,2}$, the distance between the target vehicle 404 and vehicle 408 is $d_{1,3}$, and the distance between the target vehicle 404 and vehicle 410 is $d_{1,4}$. If the vehicle 412 was included in the coarse grouping 402, the average distance to the target vehicle 404 would be greater than the threshold distance and thus was not included in the coarse grouping 402. In other embodiments, vehicles that are within the threshold distance, determined individually rather than averaged among a group of vehicles, may be included in the coarse grouping 402. Note, however, that localization does not guarantee that the vehicles in the coarse grouping 402 have the same view of interest. For example, the vehicle 406 is within the threshold distance but is moving in the opposite direction, and thus does not have the same view of interest. To ensure that the vehicles in the grouping share a view of interest, objects of interest may be considered.

Referring now to FIG. 5, a scenario 500 of a fine grouping 502, 514 of connected vehicles as performed in step 208 of the process 200 of FIG. 2 is depicted. To group vehicles having a common view of interest, the objects of interest in each vehicle's view may be determined, although localization may also remain a factor. Such a determination may be made by a server that has received images from each vehicle in a prospective grouping.

A server may receive sample images from vehicles to form a global map of the environment. The server may analyze the global map to detect the objects of interest within it. The server may determine the fine grouping 502 based on the number of shared objects of interest that the vehicles perceive. For example, a fine grouping 502 may be established because the vehicles 504, 506, and 508 of coarse grouping 402 have a common object of interest (i.e., vehicle 512) in their views of interest. Vehicle 516 does not have vehicle 512 in its view of interest and thus is placed in another fine grouping 514.

The server may respond to the vehicles, whose sample images it received, with the objects of interest contained within the sample images and/or the fine grouping it belongs to. Once the vehicles know which fine grouping they belong to, they may continue with the remainder of the offloading process.

Referring now to FIG. 6, a schematic diagram 600 of generating a global map 612 is depicted. To begin grouping, connected vehicles 602, 604 take sample images 606, 608 and send them to a server 610 to create a global map 612. The connected vehicles 602, 604 and/or the server 610 may detect objects of interest in the sample images 606, 608 through any image recognition process. The server 610 may identify common objects of interest between the sample images 606, 608 to populate a global map 612. The global map may be used to add and remove vehicles to a grouping based on the common objects of interest the vehicles perceive. Vehicles are part of the same grouping when they contain a ratio of overlapping objects of interest greater than a threshold ratio ft. The threshold ratio may be a fixed, predetermined number or a dynamically determined number that changes based on the size of a grouping (e.g., threshold increases when there are more common objects of interest to form more groups in a crowded area).

For example, the vehicle 602 captures image 606 and the vehicle 604 captures image 608 and each vehicle sends their image to the server 610. The server 610 builds a global map 612 containing the objects of interest from images 606, 608 and where they were perceived. The server 610 identifies 8 objects of interest ($OaI_1$) in image 606 (i.e., 3 vehicles, 2 bikes, 2 motorcycles, and a pedestrian) and stores their information in the global map 612. The server 610 identifies 9 objects of interest ($OoI_2$) in image 608 (i.e., 6 vehicles, 2 bikes, and a motorcycle) and stores their information in global map 612. The server 610 has a programmed ratio of 0.5. To determine whether the two images have a threshold ratio of more than 0.5, the server 610 identifies the objects of interest in one image that are common between the images and divides the amount by the number of objects of interest in the grouping. Because there is no grouping yet, the server 610 divides the number of common objects of interest by the total number of unique objects between the two images. In this example the ratio is $$\frac{(OoI_1 \cap (OoI_1 \cup OoI_2))}{(OoI_1 \cup OoI_2)} = \frac{6}{11} > 0.5$$

The 6 common objects of interest are marked by a box having a solid line in images 606, 608. Other objects of interest are marked by a box having a dashed line in images 606, 608. Because the images have objects of interest in common greater than the threshold ratio, the server 610 sends a signal to the vehicles 602, 604 to form a fine grouping and coordinate the rest of their offloading.

Referring now to FIG. 7, a segmenting process 700 as performed in step 104 of the method 100 of FIG. 1 and steps 212, 220 of the process 200 of FIG. 2 is depicted. Discussion of FIG. 7 will be made with reference to FIGS. 1, 2, and 6.

At segmenting steps 212, 220, the image 606 captured by the vehicle 602 may be segmented. Segmenting may be performed by the vehicle 602. The shape, layout, and/or number of blocks may be dynamically determined by the server 610 or preprogrammed. Here, the image 606 is segmented into 16 rectangular blocks that are evenly distributed throughout the image 606. Each block may be analyzed to determine its value. The value may be based on a block value function having parameters including a number of objects of interest (OoI) object type, object speed, object coverage, and other object characteristics in each block. For instance, the value of the kth block of connected vehicle i is $$\text{Value}_i^k = \text{function}(\#OoI_i^k, \text{Object\_type}_i^k, \text{Object\_speed}_i^k, \ldots)$$

where pedestrians may receive a higher value than vehicles, faster objects may receive a higher value than slower objects. Objects of a certain type may result in a block having a higher value. For example, bikes may receive higher values because their movements may be more erratic than a car, and thus would the connected vehicle 602 would have to respond sooner. Additionally, objects of interest nearer to the vehicle 602 may receive higher values because the vehicle 602 has less time to react due to the object's proximity. For example, block 712 will likely have a higher value than block 708 because it contains an object of interest, which is a bike that is moving and near the vehicle. Furthermore, blocks that do not have objects of interest may receive lower values because they do not contain critical information. For example, block 708 will likely have the lowest value of the image 606 because it contains only the sky, which is likely to be redundant information between images. Moreover, blocks having more objects of interest may have a higher value than blocks having fewer objects of interest. For example, block 710 has two objects of interest and thus may have a higher score than block 712, which only has one object of interest.

The vehicle in a grouping with a higher average block value in the captured image may have a longer data collection window to collect perception data and a higher priority (e.g., higher selection for scheduling, larger allocated bandwidth, etc.) to offload the perception data. The blocks with a higher value in a single image may be scheduled for offloading sooner than blocks with a lower value.

Referring now to FIG. 8A, a latency period 800 for data offloading using an offloading process without segmenting an image into blocks is depicted. In the encoding phase 802, images are processed such that they may be more easily stored or transferred. Images may be encoded at or after the time of capture. The encoding process may be found in file formats such as MOV, JPG, MP4, RAW, RAF, DNG, HEVC, HEIC, and the like. It should be understood that the present disclosure is not limited to any particular encoding process. The encoding phase 802 relies on vehicle computing systems to processes the images captured by the vehicle for offloading.

In the offloading phase 804, images are uploaded to the server for processing. The order in which images are uploaded may depend on the image's scheduling priority. Depending on the size of the image being uploaded, the image's data may be packetized for transmission over a network, wherein the image's data is broken up into packets for transportation to the server from the connected vehicle via the network. The protocols used for packetizing may be any protocol of the transportation layer (L4) of the OSI model for computer networking. Packetizing differs from the segmenting step 104 of process 100 in that it is not each individual photo being divided into logical blocks for detection of objects of interest, but rather it is a means for transmitting data over a computer network regardless of the data's contents. For instance, multiple blocks of a segmented image could be included in a single packet.

In the decoding phase 806, the server (e.g., the server 318 in FIG. 3) decodes the received image. This process may include de-packetizing, decompressing, or other processing methods complementary to the processes utilized in the encoding phase 802. The decoding phase 806 relies on server computing systems to process the images offloaded from connected vehicles.

In the detection phase 808, the server further processes the received image for detecting objects of interest. In this phase, the server may generate a global map of detected objects of interest that may include object information including their location, when they were detected, who detected them, and other information about the objects of interest. The server may share information about the objects of interest stored in the global map between vehicles to increase the comprehensiveness of vehicle environmental perception, facilitate vehicle grouping, and reduce redundant data.

Referring now to FIG. 8B, a latency period 810 for data offloading using processes according to one or more embodiments shown and described herein is depicted. The latency period 810 disclosed herein may be shorter than the latency period 800 in FIG. 8A even in a single-vehicle setting. Assuming data transmission and processing consume different computer system resources that do not affect each other, methods disclosed herein ensure that more critical data is offloaded first and that offloading is more efficient due to parallel transmission and detection. Rather than performing each phase of the offloading process for the entire image, which uses one system component at a time, a vehicle may segment the image into blocks and stagger blocks through the phases of the offloading process to utilize multiple system components in parallel.

For example, referring also to the system 300 of FIG. 3, block 1 has a higher value than block 4, which has a higher value than block 5. Because block 1 has the highest value, it is offloaded first. To be offloaded first, it must go through the encoding phase 802 first, which may utilize the processor component 304 of a vehicle system. After block 1 has been encoded and while it is in the offloading phase 804, which may utilize the network connectivity component 314 of a connected vehicle 302, the connected vehicle 302 may encode block 4 because the offloading phase 804 and the encoding phase 802 utilize different system resources of the vehicle. After block 1 has been offloaded from the vehicle and while it is in the decoding phase 806 at the server 318, which may utilize the processor component 322 of the server 318, the connected vehicle 302 may offload block 4 and begin encoding block 5. After block 1 has been decoded by the server 318 and while it is in the detection phase 808 at the server 318, the server 318 may decode block 4 and the connected vehicle 302 may offload block 5. After block 4 has been decoded and while it is in the detection phase 808 at the server 318, the server 318 may decode block 5.

Referring now to FIG. 9A, a latency period 900 for data offloading from multiple connected vehicles without segmenting images into blocks is depicted. The latency period 900 for vehicle 902 may be similar to the latency period of FIG. 8A for a single-vehicle because the offloading process is similar. The entire image to be offloaded by vehicle 902 goes through the encoding phase 908, the offloading phase 910, the decoding phase 912, and the detection phase 914 at once. Between vehicles 902, 904, 906, the encoding phase 908 for each vehicle 902, 904, 906 may be simultaneous or may be staggered.

The offloading phase 910 relies on the network systems to transport the images to the server. Because resources of the network systems are shared between multiple vehicles, the network resources may be distributed among vehicles in a group to facilitate efficient transportation of the data. For example, once the first vehicle 902 has completed the offloading phase 910, the second vehicle 904 may begin the offloading phase 910. Once the second vehicle 904 has completed the offloading phase 910, the third vehicle 906 may begin the offloading phase 910. This may result in the offloading phase 910 for each vehicle 902, 904, 906 being staggered to increase efficiency.

The server processes the image in a decoding phase 912 and a detection phase 914 as images arrive at the server. The server processes the whole image before processing another image. For example, the server will decode the entire transferred image from vehicle 902 before proceeding to decode the next transferred image from vehicle 904.

Referring now to FIG. 9B, a latency period 916 for data offloading from multiple connected vehicles using offloading processes according to one or more embodiments shown and described herein is depicted. Embodiments of the present disclosure may consider vehicle groups as an entity and, given a time period and limited network resources, schedules the data encoding and offload for vehicles to maximize both the total value of the offloaded image blocks and sensing coverage (i.e., the number of sensed objects in the group). This way, offloaded data is more valuable, redundant data may be reduced, low-value data may be reduced, and offloading efficiency may be improved due to parallel transmission and detection.

Each block offloaded by vehicle 902 goes through phases 908, 910, 912, 914 one at a time. Some embodiments may allow for multiple blocks to go through each phase as hardware permits. Embodiments of the present disclosure have lower latency 916 than alternative methods because blocks can be processed in parallel and processing may be distributed between vehicles. For example, block 1 may be processed by vehicle 902, block 2 may be processed by vehicle 904, and block 6 may be processed by vehicle 906, simultaneously.

Although encoding may be performed between vehicles simultaneously, the offloading process may be staggered between vehicles. The offloading phase 910 relies on the network systems to transport the images to the server. Because resources of the network systems are shared between vehicles 902, 904, 906, the network resources may be used by one vehicle at a time to facilitate efficient transportation of the data. Scheduling vehicles for the offloading phase may be optimized based on a maximization function having parameters including block value and block coverage as weighted by a set of quality of service requirements so that the server may receive the blocks that provide it the most value and coverage. Block value may be based on objects of interest within the block, and block coverage may be based on the global map and how much a block contributes to the information contained within the global map. Quality of service requirements may include latency, data freshness, availability, and other data and infrastructure constraints. Vehicles with a higher average block value may be scheduled to offload first. Additionally, vehicles with a higher average value of the captured image may be allocated more network resources to prioritize the transfer of more valuable information. For example, because vehicle 902 has a higher average block value than vehicles 904, 906, vehicle 902 was scheduled to offload first and was allocated more network resources to offload more blocks than vehicles 904, 906.

The server may process blocks in a decoding phase 912 as they arrive at the server. The server may also process blocks in a detection phase 914 as they finish a decoding phase 912. While in the detection phase 914, the server may also process blocks in a decoding phase as other blocks are being processed in a detection phase 914.

It should now be understood that embodiments described herein are direct to systems and methods for environment perception-based data offloading from numerous connected vehicles. One or more connected vehicles may capture environment perception data that are digital representations of the environment. If there is more than one vehicle, the vehicles may be grouped based on their location and/or their commonly perceived objects of interest. A server may maintain a global map of objects of interest to facilitate the grouping of vehicles. A vehicle or a group of vehicles may segment their image into blocks and assign a value to each block based on a value function. Blocks may be scheduled for offloading based on their assigned values. In a group of vehicles, vehicles may also be scheduled and/or allocated network resources based on the total average block value. Blocks may then be offloaded from the vehicle to the server according to the vehicle and/or block scheduling for processing by the server. The server may process the received blocks by updating the global map, updating information about objects of interest, detecting new objects of interest, updating vehicle groupings, updating resource allocation to vehicles in vehicle groupings, and other image processing.

It should be understood that flowcharts depicted and described herein are not limited to the steps included nor to the order of the steps included. Furthermore, the term "images" as used herein may refer to still photos, point clouds, 3D renderings, and other digital representations of environmental perception as well as frames that may comprise a video.

For the purposes of describing and defining the present disclosure, it is noted that reference herein to a variable being a "function" of a parameter or another variable is not intended to denote that the variable is exclusively a function of the listed parameter or variable. Rather, reference herein to a variable that is a "function" of a listed parameter is intended to be open-ended such that the variable may be a function of a single parameter or a plurality of parameters.

It is noted that recitations herein of a component of the present disclosure being "configured" or "programmed" in a particular way, to embody a particular property, or to function in a particular manner, are structural recitations, as opposed to recitations of intended use. More specifically, the references herein to the manner in which a component is "configured" or "programmed" denotes an existing physical condition of the component and, as such, is to be taken as a definite recitation of the structural characteristics of the component.

Having described the subject matter of the present disclosure in detail and by reference to specific embodiments thereof, it is noted that the various details disclosed herein should not be taken to imply that these details relate to elements that are essential components of the various embodiments described herein, even in cases where a particular element is illustrated in each of the drawings that accompany the present description. Further, it will be apparent that modifications and variations are possible without departing from the scope of the present disclosure, including, but not limited to, embodiments defined in the appended claims. More specifically, although some aspects of the present disclosure are identified herein as preferred or particularly advantageous, it is contemplated that the present disclosure is not necessarily limited to these aspects.

What is claimed is:

1. A method for offloading data comprising:
   capturing an image of a view of interest from a vehicle;
   segmenting the image into a plurality of blocks;
   determining a scheduling priority for each of one or more blocks among the plurality of blocks based on block values, wherein the block values relate to one or more objects of interest contained in each of the one or more blocks; and
   offloading, from the vehicle to a server, one or more blocks based on the scheduling priority of the one or more blocks.

2. The method of claim 1, further comprising, before determining the scheduling priority:
   generating, by the server, a global map based on a plurality of images from a plurality of vehicles;
   identifying, by the server, a plurality of objects in the global map; and identifying, by the server, a plurality of objects of interest among the plurality of objects.

3. The method of claim 1, further comprising:
identifying, by the server, a first set of vehicles among a plurality of vehicles based on localization data related to the first set of vehicles; and
grouping, by the server, the identified first set of vehicles to form a coarse grouping including the vehicle.

4. The method of claim 3, further comprising:
identifying a second set of vehicles within the coarse grouping having a shared object of interest; and
grouping the identified second set of vehicles to form a fine grouping including the vehicle.

5. The method of claim 1, further comprising calculating the block values for the one or more blocks among the plurality of blocks based on parameters for each of the one or more blocks.

6. The method of claim 5, wherein the parameters include a number of objects, an object type, an object speed, or combinations thereof.

7. The method of claim 1, wherein determining the scheduling priority for each of one or more blocks among the plurality of blocks is based on the block values of one or more blocks such that a higher block value corresponds to a higher scheduling priority.

8. The method of claim 1, further comprising:
calculating an average block value for each vehicle among a plurality of vehicles; and
scheduling offloading by one or more vehicles among the plurality of vehicles based on the average block values.

9. The method of claim 1, wherein determining the scheduling priority for each of one or more blocks among the plurality of blocks further comprises:
determining a block coverage for each of the one or more blocks; and
optimizing the scheduling priority according to a maximization function of the block values and the block coverage as weighted by a set of quality of service requirements.

10. The method of claim 1, further comprising, before offloading:
identifying a block among the one or more blocks that includes redundant information; and
removing the block from the one or more blocks.

11. A system for offloading data comprising a processor operable to:
capture an image of a view of interest from a vehicle;
segment the image into a plurality of blocks;
determine a scheduling priority for each of one or more blocks among the plurality of blocks based on block values, wherein the block values relate to one or more objects of interest contained in each of the one or more blocks; and
offload, from the vehicle to a server, one or more blocks based on the scheduling priority of the one or more blocks.

12. The system of claim 11, wherein the processor is further operable to, before determining the scheduling priority:
generate, by the server, a global map based on a plurality of images from a plurality of vehicles;
identify, by the server, a plurality of objects in the global map; and
identify, by the server, a plurality of objects of interest among the plurality of objects.

13. The system of claim 11, wherein the processor is further operable to:
identify, by the server, a first set of vehicles among a plurality of vehicles based on localization data related to the first set of vehicles; and
group, by the server, the identified first set of vehicles to form a coarse grouping including the vehicle.

14. The system of claim 13, wherein the processor is further operable to:
identify a second set of vehicles within the coarse grouping having a shared object of interest; and
group the identified second set of vehicles to form a fine grouping including the vehicle.

15. The system of claim 11, wherein determining the scheduling priority for each of one or more blocks among the plurality of blocks further comprises:
determining a block coverage for each of the one or more blocks; and
optimizing the scheduling priority according to a maximization function of the block values and the block coverage as weighted by a set of quality of service requirements.

16. The system of claim 11, wherein the processor is further operable to, before offloading:
identify a block among the one or more blocks that includes redundant information; and
remove the block from the one or more blocks.

17. A server comprising:
a controller programmed to:
group a plurality of vehicles;
obtain images from the plurality of vehicles, each of the images corresponding to one of the plurality of vehicles and having a plurality of blocks;
obtain an image value of each of the images based on one or more objects of interest contained in each of the images;
determine scheduling priorities for the plurality of vehicles based on the image values; and
instruct the plurality of vehicles to offload data based on the scheduling priorities.

18. The server of claim 17, wherein the controller is further programmed to:
determine a block value of each block included in an image among the images based on one or more objects of interest contained in each of the blocks;
determine scheduling priorities for the blocks based on the block values; and
instruct the vehicle corresponding to the image to offload blocks based on the scheduling priorities for the plurality of blocks.

19. The server of claim 18, wherein the controller is further programmed to:
optimize the scheduling priorities for the plurality of vehicles and the scheduling priorities for the plurality of blocks such that a total of the block values of blocks received by the server is maximized.

20. The server of claim 17, wherein the controller is configured to:
obtain the image value of each of the images based on an average of block values of the corresponding image.

* * * * *

UNITED STATES PATENT AND TRADEMARK OFFICE
CERTIFICATE OF CORRECTION

PATENT NO. : 12,164,594 B2
APPLICATION NO. : 17/338884
DATED : December 10, 2024
INVENTOR(S) : Haoxin Wang et al.

Page 1 of 1

It is certified that error appears in the above-identified patent and that said Letters Patent is hereby corrected as shown below:

In the Specification

In Column 8, Line(s) 65, after "distance", delete "a" and insert --$\alpha$--, therefor.

In Column 10, Line(s) 3, delete "ft" and insert --$\beta$--, therefor.

In Column 10, Line(s) 13, delete "(OaI$_1$)" and insert --(OoI$_1$)--, therefor.

In Column 10, Line(s) 52, after "(OoI)", insert --,--.

Signed and Sealed this
Eighteenth Day of February, 2025

Coke Morgan Stewart
*Acting Director of the United States Patent and Trademark Office*